United States Patent [19]

Carmen

[11] Patent Number: 5,090,557
[45] Date of Patent: Feb. 25, 1992

[54] SIDE GRIP MEMBER FOR CONVEYOR SYSTEMS

[76] Inventor: Don Carmen, 21524 Hoover, Apt. 304, Warren, Mich. 48089

[21] Appl. No.: 531,959

[22] Filed: Jun. 1, 1990

[51] Int. Cl.⁵ .............................................. B65G 15/14
[52] U.S. Cl. .............................. 198/626.1; 198/626.6
[58] Field of Search ............ 198/604, 606, 620, 626.1, 198/626.6, 699, 699.1, 688.1, 803.01

[56] References Cited

U.S. PATENT DOCUMENTS

| | | |
|---|---|---|
| 1,355,449 | 10/1920 | Campbell ......................... 198/620 X |
| 1,911,961 | 5/1933 | Melnick .............................. 198/626.6 |
| 2,297,296 | 9/1942 | Flintjer ............................. 198/626.1 |
| 2,395,761 | 2/1946 | Reed ...................................... 198/199 |
| 2,667,386 | 1/1954 | Mathisen ................................ 305/10 |
| 2,734,621 | 2/1956 | Mojonnier ............................ 198/162 |
| 2,754,956 | 7/1956 | Sommer ............................. 198/626.6 |
| 2,809,742 | 10/1957 | Holz ...................................... 198/199 |
| 3,741,744 | 6/1973 | Bowman ................................. 65/348 |
| 3,853,016 | 12/1974 | Lane et al. ............................. 74/231 |
| 3,869,038 | 3/1975 | Piper et al. ....................... 198/626.1 |
| 3,945,547 | 3/1976 | Ledebur ........................... 198/620 X |
| 4,064,987 | 12/1977 | Rowan ........................... 198/626.6 X |
| 4,079,551 | 3/1978 | Bando ............................. 198/626.1 X |
| 4,570,785 | 2/1986 | Lewanski et al. ................. 198/626.6 |
| 4,629,063 | 12/1986 | Hodlewsky et al. ......... 198/626.6 X |
| 4,798,281 | 1/1989 | Egger ..................................... 198/698 |
| 4,809,846 | 3/1989 | Hodlewsky et al. ......... 198/626.6 X |

FOREIGN PATENT DOCUMENTS

| | | | |
|---|---|---|---|
| 0568602 | 11/1960 | Belgium ............................ 198/626.6 |
| 1221912 | 6/1960 | France ............................... 198/626.1 |
| 0721573 | 11/1966 | Italy ................................... 198/626.1 |

Primary Examiner—Robert P. Olszewski
Assistant Examiner—James R. Bidwell
Attorney, Agent, or Firm—Krass & Young

[57] ABSTRACT

The present invention provides for a side grip member for a conveyor system adaptable to connect to a specific link of a chain conveyor and to provide a relatively rigid gripping surface. The gripping surface formed on an object engaging section remains substantially rigid in use, and achieves resilience through a pair of flexible side wall members which support the gripping surface outwardly from the holder. The side members are able to flex when pressure, associated with an object to be transported, acts upon the gripping surface.

17 Claims, 2 Drawing Sheets

SIDE GRIP MEMBER FOR CONVEYOR SYSTEMS

FIELD OF THE INVENTION

The present invention relates to conveyor systems having a pair of parallel, rotatable conveyor chains which define a conveyor channel and provide for a plurality of side grip members depending from the chains and extending inward into the conveyor channel.

BACKGROUND OF THE INVENTION

It is known to provide a pair of rotatable conveyor chains having sections spaced apart and relatively parallel to one another. The space defined between the two conveyor chain sections corresponds to the conveyor channel. Side grip members are attached to each link of these conveyor chains so as to extend inwardly into the conveyor channel from either side. The conveyor chains are actuated to move the adjoining parallel sections of the two chains proximate the conveyor channel in the same direction. Articles in the conveyor channel, engaged between opposing side grip members, are transported along the conveyor channel. This side grip feature is most beneficial in transporting relatively small objects through a series of curves or changes in elevation.

U.S. Pat. No. 4,629,063 to Hodlewsky et al for a chain link for a conveyor of this type discloses a tubular gripping surface disposed on a hingeable link. U.S. Pat. No. 4,798,281 to Egger discloses a side grip member having a tubular gripping surface disposed to deform and substantially conform to the shape of the article it contacts.

The side grip members of both of these patents employ relatively tubular gripping bodies having surfaces which tend to deform on contact with an object placed in a conveyor channel associated therewith. These flexible gripping surfaces do not readily resist the wear caused by contact with objects during use. The flexibility of the gripping surface becomes a detriment to the sustained use of a conveyor system incorporating these prior art side grip members. Once such wear occurs, the individual gripping bodies must be replaced for optimum efficiency of the overall machine.

There is a need in the industry to provide a side grip member which includes a substantially rigid gripping surface to prevent rapid wear of the gripping material. Further, there is a need to provide for rapid, efficient, and economic replacement of worn gripping members when wear does occur.

SUMMARY OF THE INVENTION

The present invention provides for a side grip member for a conveyor system adaptable to being connected to a link of a chain conveyor and to provide a relatively rigid gripping surface. The side grip member comprises a gripping member which attaches to a holder configured to engage a link on a chain conveyor. One face of the gripping member is configured to form the gripping surface. The gripping surface resists flexure, and therefore wear, when used to engage objects to be conveyed. The rigid gripping surface achieves a degree of resilience by being associated with the relatively flexible side wall members of the gripping member which support the gripping surface outwardly from the holder.

More specifically, in a preferred embodiment of the invention which will subsequently be disclosed in detail, the gripping member is molded of a polyurethane compound. The gripping member includes a relatively thick, rigid, object engaging section which defines the gripping surface. The gripping surface can be configured in a variety of contours. In the preferred embodiment the gripping surface is configured as a relatively planar section. The gripping member achieves overall resilience by a pair of relatively thin, flexible side wall members, which flex under pressure applied to the gripping surface. These side wall members naturally bias the rigid object engaging section outwardly into the conveyor channel when in use. The pair of side wall members are constructed in relatively thinner cross-section and forces acting on the gripping surface cause flexure of the side wall members, preventing the object engaging section, and therefore the gripping surface, from flexing. This construction of the gripping member allows whole body translations of the rigid object engaging section to conform to an article to be conveyed.

The gripping member further includes a base section which is configured to be attached to a holder, which will be disclosed hereinafter. The base section attaches to the opposite ends of the side wall members and is positioned in a substantially parallel plane to that of the object engaging section. In this manner, the preferred embodiment of the gripping member includes a hollow chamber defined by the relatively rigid object engaging section, the base section, and the pair of side wall members.

The holder is configured of rigid material and includes a vertically disposed plate. A pair of cylindrical studs project perpendicularly from a first face of the holder plate. On the opposite face, an attachment member is configured to be welded or otherwise attached to a specific link in the chain conveyor.

The gripping member attaches to the holder by means of active engagement with the pair of perpendicularly projecting studs. The base section of the gripping member includes a pair of openings therein which engage the pair of studs on the holder. In this manner, the studs project through the base section and terminate within the hollow area disposed within the overall gripping member. A retaining clip is inserted into the hollow chamber and engages a groove on the ends of one of more of the studs to secure the base section of the gripping member between the retaining clip and the holder.

BRIEF DESCRIPTION OF THE DRAWINGS

These and other objects and aspects of the invention will be apparent in the detailed description of the invention hereinafter. With respect to the drawings in which.

DETAILED DESCRIPTION OF THE PREFERRED EMBODIMENT

Figure 1:
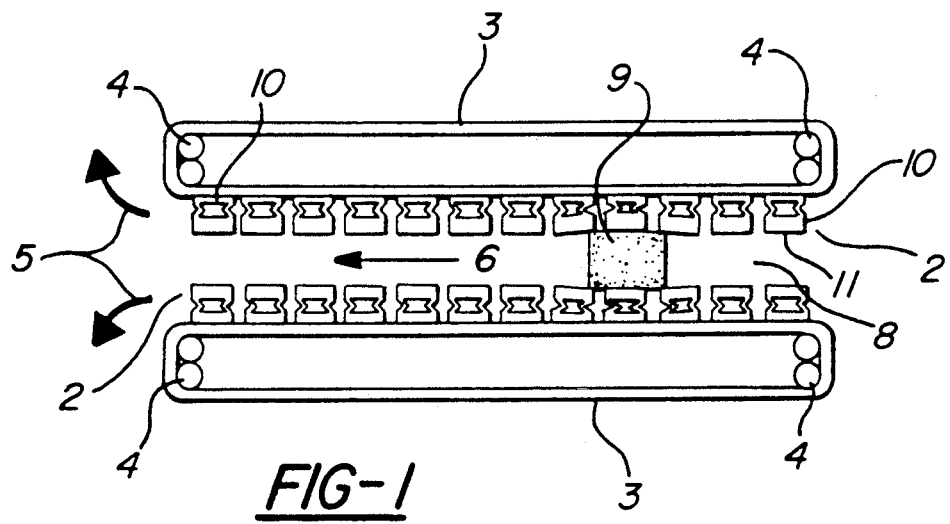
FIG. 1 is a diagram of the side grip members in use.

With reference to FIG. 1, a plurality of the side grip members 2 of the present invention are disposed on a pair of chain conveyors 3 which rotate upon conveyor posts 4 in opposite directions 5. This produces motion of the grip members 2 in the same direction 6 in an area between the two chain conveyors 3 which define a conveyor channel 8 for objects 9 to be moved therein. In use, the present invention provides for a plurality of relatively rigid gripping surfaces 11 to project into conveyor channel 8. Any objects 9 inserted into the conveyor channel 8 will be transported due to engagement with the opposed gripping surfaces 11. Each side grip member 2 provides a substantially rigid forward gripping face 11 to provide secure engagement with an object 9.

Figure 2:
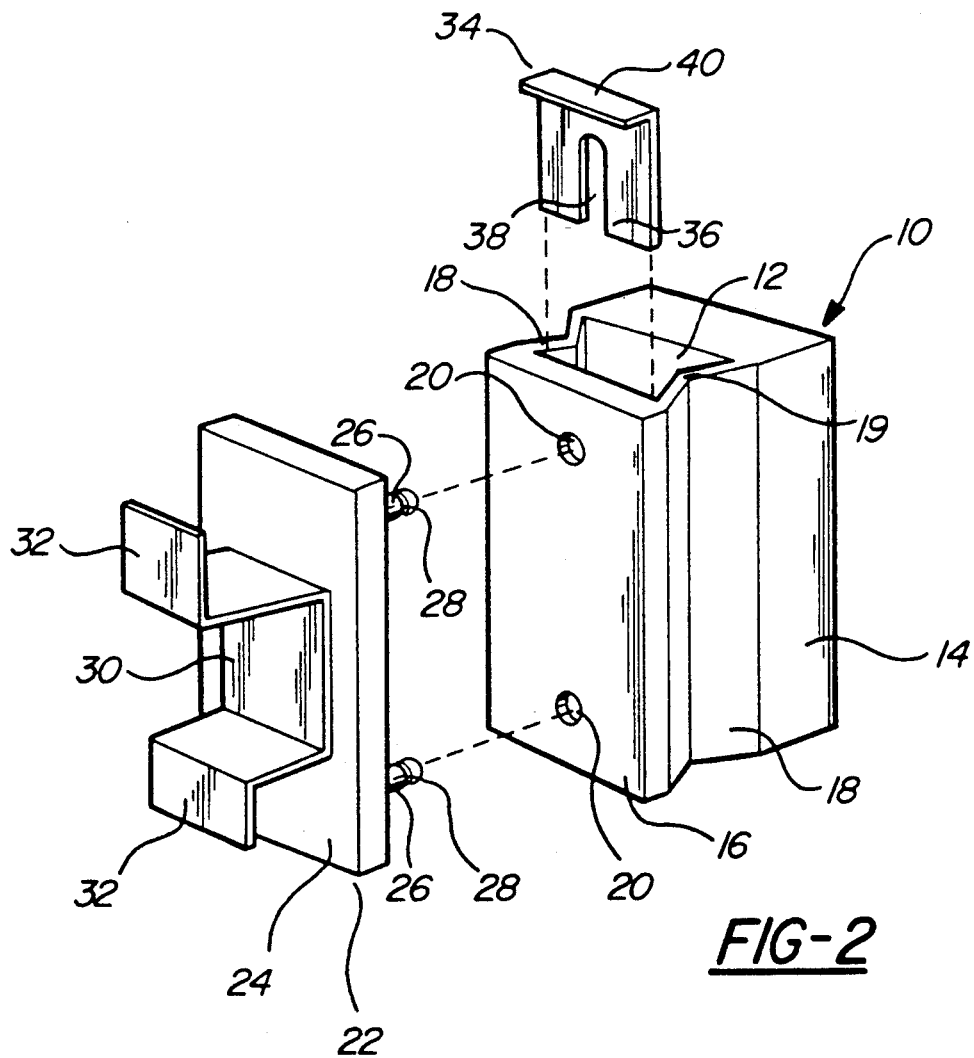
FIG. 2 is an exploded perspective view of the preferred embodiment of the side grip members.

With reference to FIGS. 1 and 2, the side grip member 2 comprises a gripping member 10 which has a hollow chamber 12 therein. The overall grip member 2 has a rectangular profile, typically having its longer axis oriented perpendicular to the chain conveyors 3 when mounted on the conveyor system. In this manner the openings into hollow chamber 12 are positioned at the top and bottom of the side grip member 2 when used on a horizontally disposed conveyor system as shown in FIG. 1.

The gripping member 10 is preferably molded of a polyurethane compound to allow the control of the flexure properties of the overall gripping member 10 by the relative geometry of various sections thereof, as will be described hereinafter.

The gripping member 10 more specifically includes a forward, relatively rigid, object engaging section 14 and a rear base section 16 attached together through a pair of flexible side wall members 18. The connection of the forward object engaging section 14 and the rear base section 16 by side wall members 18 produces the hollow chamber 12 in the gripping member 10. The base section 16 is configured with a pair of circular openings 20 to engage a holder 22, as described hereinafter.

The holder 22 includes a rigid plate 24, preferably made of steel or similar metal. The plate 24 is substantially planar. A pair of cylindrical studs 26 project perpendicularly away from one face of the plate 24. The pair of studs 26 are configured to engage the pair of circular openings 20 in the rear base section 16 of the gripping member 10. The studs include a circumferential groove 28 proximate the tip portion of each stud 26, which, upon engagement with circular openings 20, projects through rear base section 16 and into the hollow chamber 12 of gripping member 10.

The pair of studs 26, preferably made of steel or similar metal; can be attached to plate 24 via a number of conventional methods. Studs 26 can be stud welded to the plate 24 or could engage an opening produced in plate 24 utilizing threads or serrations.

The opposite face of the holder 22 attaches to a single link of a chain conveyor system through a U-shaped bracket 30 having a pair of flared legs 32 disposed to engage a specific link of the chain conveyor. The U-shaped bracket 30 can be welded, bolted, or otherwise affixed to the holder.

A retaining clip 34, inserted into the hollow chamber 12, engages one or more of the circumferential grooves 28 of studs 26. The retaining clip 34 has a pair of downwardly projecting legs 36. These legs 36 define a central engagement slot 38 of sufficient dimension to engage one or more of the grooves 28. An end flange 40 provides for a convenient manual gripping surface for insertion and removal of slotted retaining clip 34.

Typically, only one retaining clip 34 would be utilized to engage one or both of the studs 26. When side grip members 2 are attached to a horizontally disposed conveyor system an opening into hollow chamber 12 is accessible from above. The retaining clip 34 can be inserted into chamber 12 to engage studs 26. The side grip members 2 when attached to the horizontal conveyor system are typically quite accessible from above in a large variety of locations for replacement, while the grip members 2 are substantially less accessible from below due to the proximity with the conveyor channel 8 and related components. This arrangement continues whether the conveyor system is oriented horizontally, vertically, or in an inclined position. By having the grip members 2 oriented perpendicular to the conveyor chains 3, one end of the grip member 2 projects outward from the conveyor channel 8, while one end projects toward the base of the conveyor channel 8. The end projecting outward which provides access to the hollow chamber 12 remains accessible for an typical orientation of a conveyor system.

Figure 3:
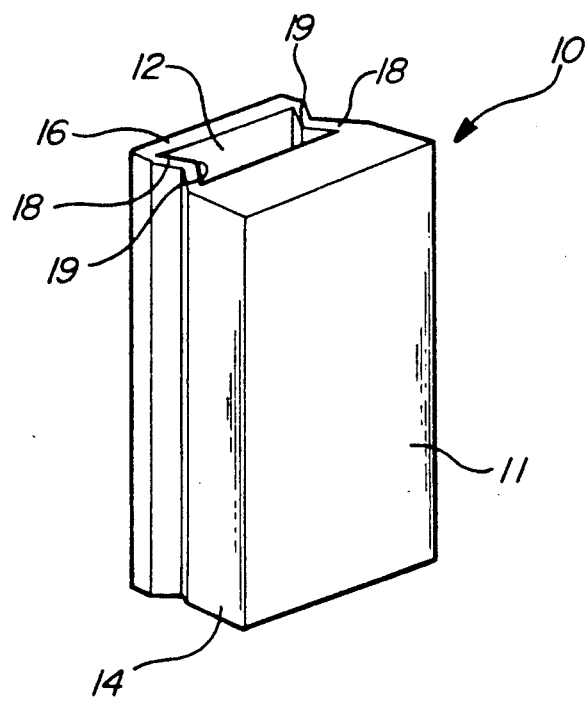
FIG. 3 is a perspective view of the resilient gripping body in an unstressed condition.

With reference to FIG. 3, the resilient gripping body 10 includes a forward object engaging section 14 and a rear base section 16 producing a substantial hollow chamber 12 separated by side wall members 18. Each side wall member 18 is formed of two planar sections joined at an angle to provide a flex point 19 at their apex. The planar sections are designed so that the apexes point toward one another. This inwardly canted angle allows side grip members 2 to be oriented proximate one another without contacting each other upon flexure of side wall members 18. Gripping face 11 is provided on relatively rigid object engaging section 14. Pressure acting on gripping face 11 causes flexure in the relatively thin side wall members 18. Pressure forces are generally concentrated at flex point 19, and flexure of side wall members 18 center about this flex point 19. As a result, object engaging section 14, being of thicker dimension than side wall members 18, undergoes whole body translations as a result of pressure on gripping surface 11 due to contact with an object to be transported.

Figure 4:
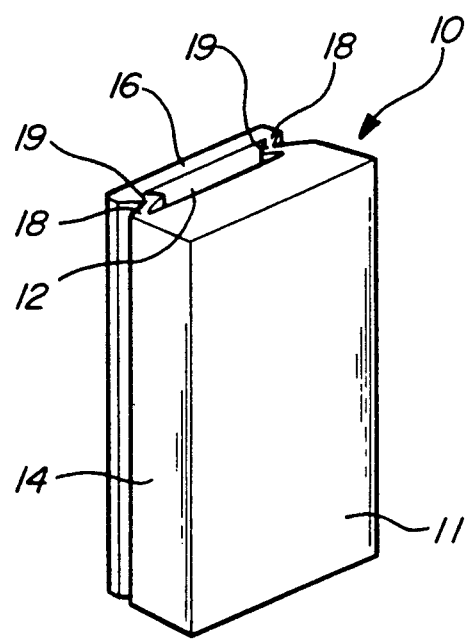
FIG. 4 is a perspective view of the resilient gripping body in a stressed condition.

With reference to FIG. 4, a uniform pressure distributed about the entire gripping surface 11 of forward object engaging section 14 causes relatively uniform flexure of the side wall members 18. Flexure is divided substantially equally between the two side wall members 18 and uniformly reduces the width of hollow chamber 12. Each side wall member 18 flexes about its respective flex point 19 since the side wall members 18 are both angled to concentrate forces and relatively thin in comparison with the thickness of object engaging section 14.

Figure 5:
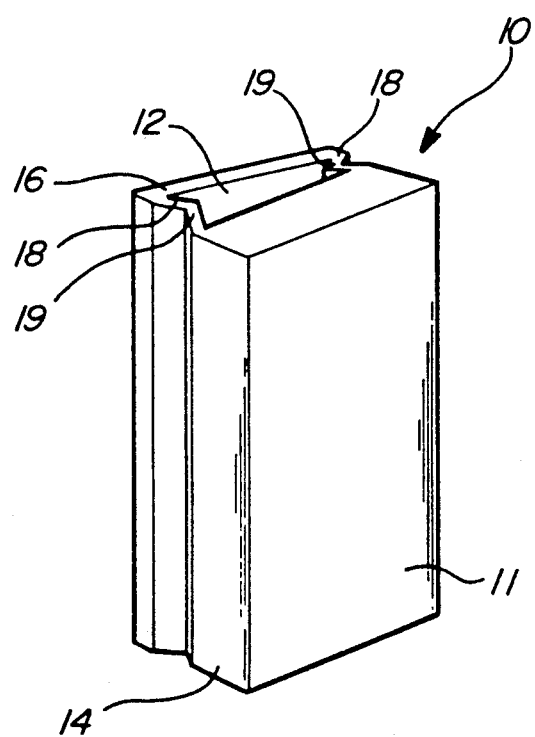
FIG. 5 is a perspective view of the resilient gripping body in a partially stressed condition.

With reference to FIG. 5, a pressure acting on the gripping surface in an uneven manner produces more significant flexure in one of the pair of side wall members 18 relative the other producing a canting of hollow chamber 12. The gripping member 10 is adaptable to engage a variety of angled article surfaces through the uneven flexure of side wall members 18 about flex points 19 providing an angled, yet uniform, gripping surface 11. In the preferred embodiment, the gripping surface is planar. Thus, the gripping member 10 retains the relatively planar gripping surface 11 regardless of the amount or angle of flexure in engaging all or a portion of an object.

The rigid gripping surface 11 tends to resist wear due to its rigidity. In case of wear, however, the gripping member 10 is easily removable at any location on the chain conveyor allowing access to the gripping body 10. The retaining clip 34 is manually removed to disengage the member 10 from studs 26. The gripping member 10 thereby becomes freely removable. In like manner, a new gripping member 10 may be inserted on studs 26 and secured by the retaining clip 34 in short order.

In operation a series of side grip members 2 are attached to each of the pair of rotatable conveyor chains 3. The side grip members 2 extend inwardly into the conveyor channel 8. Upon rotation of the chains 3, pairs of opposed grip members 2 sequentially rotate into alignment at the beginning of the channel 8 and proceed along the channel path. Objects 9 placed into the channel 8 are engaged by one or more pairs of opposed side grip members 2. The gripping members 10 deform upon contact with the objects 9, causing the rigid object engaging sections 14 to undergo whole body translations until reaching optimum gripping orientations. The rigid object engaging sections 14 being biased outwardly by side walls 18, are provided with a natural gripping force to engage objects 9 between opposed side grip members 2.

From the foregoing description of the preferred embodiment, it can be seen that various alternative embodiments of the invention can be implemented without departure from the scope of the invention as defined in the following claims.

I now claim:

1. A side grip member for use with a side grip conveyor of the type having a pair of closed loops of chains each consisting of separate links, the two loops being arrayed so as to include sections which extend parallel to and closely spaced from one another to form a conveyor channel between the two sections, the side grip member comprising:

a holder adapted to be connected to a link and a unitary gripping member adapted to be removably attached to said holder, said gripping member comprising a single piece structure which includes a relatively rigid object engaging section and relatively resilient section for supporting said object engaging section with respect to said holder, said relatively resilient section being formed integrally with and substantially of the same material as said relatively rigid object engaging section, such that, when the gripping member is mounted on said holder, said object engaging section projects into said conveyor channel to engage objects to be transported and forces imposed on said conveyor channel causes deformation of said resilient supporting section, without substantial deformation of said object engaging section.

2. The invention of claim 1, wherein said unitary gripping member is molded of a polyurethane compound.

3. The invention of claim 1, wherein said relatively resilient means for supporting said object engaging section includes a pair of flexible side wall members extending between said holder and said object engaging section.

4. The invention of claim 3, wherein each of said flexible side wall members is formed by a pair of relatively planar sections forming at least one inwardly canted angle.

5. The invention of claim 1, wherein a fixed pair of retaining studs are mounted on and project perpendicularly away from said holder, said gripping member being configured to removeably engage said pair of retaining studs.

6. The invention of claim 1, wherein said object engaging section further includes a substantially planar gripping face.

7. The invention of claim 5, wherein
said side grip member further includes a removable retaining clip; and
said gripping member is further configured to receive said retaining clip so that said retaining clip may engage at least one of said studs within said gripping member to secure said gripping member on said holder.

8. The invention of claim 7, wherein
said at least one of said studs includes a circumferential groove proximate the free end thereof; and
said retaining clip includes a slot configured to engage said groove to secure said gripping member to said holder.

9. The invention of claim 8, wherein said slot in said retaining clip is formed by a pair of downwardly projecting legs which define a slot having an opening on one side of said retaining clip.

10. A side grip member for use with a side grip conveyor of the type having a pair of closed loops of chains each consisting of separate links, the two loops being arrayed so as to include sections which extend parallel to and closely spaced from one another to form a conveyor channel between the two sections, the side grip member comprising:

a holder adapted to be connected to a link and a unitary gripping member adapted to be removeably attached to said holder, said gripping member including a relatively rigid object engaging section, a base section configured to engage said holder, and a pair of flexible side wall members extending between said object engaging section and said base section, such that, when said gripping member is mounted on said holder, said object engaging section projects into said conveyor channel to engage objects to be transported and forces imposed on said object engaging section by objects within said conveyor channel causes deformation of said flexible side wall members, without substantial deformation of said object engaging section.

11. The invention of claim 10, wherein a fixed pair of retaining studs are mounted on and project perpendicularly away from said holder, and said base section of said gripping member is configured to removeably engage said studs.

12. The invention of claim 11, wherein
said side grip member further includes a removable retaining clip; and
said unitary gripping member is configured to receive said retaining clip so that said retaining clip may engage at least one of said retaining studs within said gripping member to secure said gripping member to said holder.

13. The invention of claim 12, wherein said retaining studs project through said base section of said gripping member when said gripping member is mounted on said holder, said retaining studs each further including a circumferential groove proximate the free end thereof, said retaining clip including a slot configured to engage said groove on at least one of said pair of retaining studs to secure said gripping member to said holder.

14. The invention of claim 13, wherein said slot, in said retaining clip is formed by a pair of downwardly projecting legs which define a slot having an opening on one side of said retaining clip.

15. The invention of claim 10, wherein said unitary gripping member is molded of a polyurethane compound.

16. The invention of claim 10, wherein each of said flexible side wall members is formed by a pair of relatively planar sections forming at least one inwardly canted angle.

17. A side grip member for use with a side grip conveyor of the type having a pair of closed loops of chains each consisting of separate links, the two loops being arrayed so as to include sections which extend parallel to and closely spaced from one another to form a conveyor channel between the two sections, the side grip member comprising:

a holder adapted to be connected to a link, said holder having a pair of cylindrical retaining studs, each having a free end projecting toward said conveyor channel, at least one of said pair of cylindrical retaining studs having a circumferential groove disposed proximate its free end;

a gripping member removeably attached to said holder and engaging said retaining studs, said gripping member including a base section configured to engage said retaining studs, a relatively rigid, object engaging section disposed substantially parallel to said base section and configured to provide a relatively planar gripping surface, and a pair of flexible side wall members connecting said base section to said rigid object engaging section; and a slotted retaining clip configured to engage the groove on said at least one of said pair of retaining studs to removeably attach said gripping member to said holder whereby, when said gripping member is mounted on said holder, said object engaging section projects into said conveyor channel to engage objects to be transported and forces imposed on said relatively planar gripping surface by objects within said conveyor channel causes deformation of said flexible side wall members, without substantial deformation of said object engaging section.

* * * * *

UNITED STATES PATENT AND TRADEMARK OFFICE
CERTIFICATE OF CORRECTION

PATENT NO. : 5,090,557

DATED : February 25, 1992

INVENTOR(S) : Carmen

It is certified that error appears in the above-identified patent and that said Letters Patent is hereby corrected as shown below:

Column 4, line 16, change "an" to --any--;

Column 6, line 65, change "slot, in" to --slot in--.

Signed and Sealed this

Eleventh Day of May, 1993

Attest:

MICHAEL K. KIRK

*Attesting Officer*     *Acting Commissioner of Patents and Trademarks*